(12) United States Patent
Albert et al.

(10) Patent No.: US 9,716,636 B2
(45) Date of Patent: Jul. 25, 2017

(54) TECHNIQUES FOR ACCOUNTING FOR MULTIPLE TRANSACTIONS IN A TRANSPORT CONTROL PROTOCOL (TCP) PAYLOAD

(71) Applicant: CISCO TECHNOLOGY, INC., San Jose, CA (US)

(72) Inventors: Mark Albert, Cary, NC (US); Robert Batz, Raleigh, NC (US); Louis Menditto, Raleigh, NC (US); Richard Gray, Cary, NC (US); Tzu-Ming Tsang, Chapel Hill, NC (US); Michael Sutton, Garner, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 476 days.

(21) Appl. No.: 13/859,510

(22) Filed: Apr. 9, 2013

(65) Prior Publication Data
US 2014/0149580 A1 May 29, 2014

Related U.S. Application Data

(63) Continuation of application No. 11/175,849, filed on Jul. 6, 2005, now Pat. No. 8,438,281.

(51) Int. Cl.
*G06F 15/173* (2006.01)
*H04L 12/26* (2006.01)
(Continued)

(52) U.S. Cl.
CPC ........... *H04L 43/04* (2013.01); *H04L 12/14* (2013.01); *H04L 12/1425* (2013.01); *H04L 67/02* (2013.01)

(58) Field of Classification Search
CPC ..................................................... H04L 12/14
(Continued)

(56) References Cited

U.S. PATENT DOCUMENTS 6,226,272 B1 5/2001 Okano et al.
6,650,640 B1 11/2003 Muller et al.
(Continued)

FOREIGN PATENT DOCUMENTS

CN 101375264 2/2009
EP 1206100 5/2002
(Continued)

OTHER PUBLICATIONS

N. Borenstein, RFC 1341, Jun. 1992.*
(Continued)

*Primary Examiner* — Kevin Mai
(74) *Attorney, Agent, or Firm* — Patent Capital Group

(57) ABSTRACT

Techniques for separately accounting for multiple transactions in the same data packets communicated over a network using Transport Control Protocol (TCP) include receiving an Internet Protocol (IP) data packet that includes Transport Control Protocol (TCP) payload data. The TCP payload is parsed to determine boundary data that indicates a byte location on a boundary between a first transaction and a second transaction. A byte count that indicates a number of bytes in the TCP payload associated with the first transaction is determined based on the boundary data. Accounting data for the first transaction is determined based at least in part on the byte count. These techniques allow a service gateway to bill separately for different requests and responses carried in TCP data packets, such as those for Hypertext Transfer Protocol (HTTP) and Real Time Streaming Protocol (RTSP).

15 Claims, 8 Drawing Sheets

(51) Int. Cl.
*H04L 12/14* (2006.01)
*H04L 29/08* (2006.01)

(58) Field of Classification Search
USPC .......................................................... 709/224
See application file for complete search history.

(56) References Cited

U.S. PATENT DOCUMENTS

| | | | |
|---|---|---|---|
| 7,046,643 | B1 | 5/2006 | Zellner et al. |
| 7,055,028 | B2 | 5/2006 | Peiffer et al. |
| 7,124,202 | B2 | 10/2006 | Lebizay et al. |
| 7,359,326 | B1* | 4/2008 | Harper ................. H04L 1/0086 370/235 |
| 7,366,790 | B1 | 4/2008 | Rustad et al. |
| 7,406,087 | B1 | 7/2008 | Quach et al. |
| 7,606,877 | B2 | 10/2009 | Lee et al. |
| 7,610,225 | B2 | 10/2009 | O'Neill |
| 2003/0091031 | A1 | 5/2003 | Kuhlmann et al. |
| 2003/0093341 | A1 | 5/2003 | Millard et al. |
| 2003/0105855 | A1 | 6/2003 | Wynnyk |
| 2004/0083299 | A1* | 4/2004 | Dietz et al. ................... 709/230 |
| 2004/0107241 | A1* | 6/2004 | Jayapalan et al. ............ 709/203 |
| 2004/0228414 | A1 | 11/2004 | Keck et al. |
| 2005/0089046 | A1* | 4/2005 | Moussa et al. .......... 370/395.52 |
| 2005/0102371 | A1 | 5/2005 | Aksu |
| 2008/0043636 | A1 | 2/2008 | Duffield et al. |
| 2008/0208770 | A1 | 8/2008 | Balassanian |

FOREIGN PATENT DOCUMENTS

| | | |
|---|---|---|
| EP | 1482680 | 12/2004 |
| EP | 1899843 | 1/2007 |
| WO | WO 2007/008334 A2 | 1/2007 |

OTHER PUBLICATIONS

Cisco Systems Inc., Cisco Content Services Gateway Installation and Configuration Guide, www.cisco.com/en/US/products/sw/wirelessw/ps779/products_installation_and_configuration_guide, Jul. 19, 2004, Publisher: Cisco Systems Inc., Published in: Internet, San Jose, CA.

PCT Jun. 5, 2008 International Search Report for International Application No. PCT/US06/23333 mailed Jun. 5, 2008, 2 pages.

PCT Jul. 8, 2008 International Preliminary Report on Patentability issued Jul. 8, 2008 (1 page) and Written Opinion of the International Searching Authority mailed Jun. 5, 2008 (3 pages) for International Application No. PCT/US06/23333.

PRC Jan. 22, 2010 SIPO First Office Action from Chinese Patent Application No. 200680032581.0, 14 pages.

PRC Jun. 4, 2010 Response to PRC First Office Action from Chinese Patent Application No. 200680032581.0 [English translation of amended claims only available]; 4 pages.

PRC Jun. 2, 2011 SIPO Second Office Action from Chinese Patent Application No. 200680032581.0; 12 pages.

PRC—Aug. 11, 2011 Response to PRC Second Office Action from Chinese Patent Application No. 200680032581.0 [English translation of claims only].

EPO Nov. 30, 2011 Supplementary Search Report and Opinion from EP Application No. EP06773262.

EPO Feb. 13, 2012 Response to Nov. 22, 2011 EP Search Report and Opinion from EP Application No. EP06773262.

PRC Feb. 14, 2012 SIPO Third Office Action from Chinese Patent Application No. 200680032581.0; 12 pages.

PRC May 2, 2012 Response to SIPO Third Office Action from Chinese Patent Application No. 200680032581.0; 52 pages.

* cited by examiner

TECHNIQUES FOR ACCOUNTING FOR MULTIPLE TRANSACTIONS IN A TRANSPORT CONTROL PROTOCOL (TCP) PAYLOAD

RELATED APPLICATION

This Application is a continuation (and claims the benefit of priority under 35 U.S.C. §120) of U.S. application Ser. No. 11/175,849, filed Jul. 6, 2005, entitled "TECHNIQUES FOR ACCOUNTING FOR MULTIPLE TRANSACTIONS IN A TRANSPORT CONTROL PROTOCOL (TCP) PAYLOAD," Inventors Mark Albert, et al. The disclosure of the prior application is considered part of (and is incorporated by reference in) the disclosure of this application.

BACKGROUND OF THE INVENTION

1. Field of the Invention

The present invention relates to processing data packets communicated over a network; and, in particular, to separately accounting for multiple transactions in the same TCP data packets.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links.

Information is exchanged between network nodes according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol.

The headers included in a packet traversing multiple heterogeneous networks, such as the Internet, typically include: a physical (layer 1) header; a data-link (layer 2) header; an internetwork (layer 3) header (such as an Internet Protocol, IP, header); a transport (layer 4) header (such as a Transport Control Protocol, TCP, header); and one or more applications layers (layers 5, 6, 7) as defined by the Open Systems Interconnection (OSI) Reference Model.

A widely used application layer (layer 7) protocol is the Hypertext Transfer Protocol (HTTP) which is used to access and transport data files (called documents) that may have links to other documents, such as Hypertext Markup Language (HTML) documents commonly known as Web pages. HTTP version 1.1 (HTTP 1.1) is described at the time of this writing in Internet Engineering Task Force (IETF) request for comments (RFC) 2616 which can be found in a file named rfc2616.txt, which can be found, along with other RFC files, at the world wide web domain www.ietf.org in the file directory named rfc. The entire contents of RFC 2616 are hereby incorporated by reference as if fully set forth herein. Any document that may be transferred using HTTP is an HTTP resource. HTTP resources include Web pages, text, audio, images and video.

A resource is transmitted using HTTP from an HTTP server (often called a Web server) to an HTTP client (often called a Web browser, or, simply, browser) in response to a request from the HTTP client. The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons. As used herein, a single HTTP transaction is a single request for a HTTP resource and the HTTP resource returned to the HTTP client in response to that request.

With recent technological advances, various specialized and mobile devices have participated in network communications, including HTTP transactions. Such devices include, but are not limited to, wireless telephones, personal digital assistants (PDAs), electronic notebooks, household appliances, devices for human interface, and other devices capable of initiating or receiving voice or data communicated over a network. Network communications with such devices are often routed through a server called a Service Gateway (SG). The SG performs various functions for the device, such as reformatting resources for the special characteristics of the device. Some services are subscriber aware and determine the subscriber associated with a device by monitoring messages exchanged between the device and an Authentication, Authorization, and Accounting (AAA) server. AAA servers are widely known in the art and include Remote Authentication for Dial In User Service (RADIUS)

servers, Diameter servers, and Terminal Access Controller Access Control System (TACACS) servers. Various subscriber-aware services are known, such as filtering data by content, filtering by source (e.g., firewall services), data compression for faster transfers, encryption, and guaranteeing a minimum quality of service to support high throughput and delay sensitive communications like voice over IP, among others.

Many services provided by a SG are paid for based on the amount of usage; and the SG thus tallies usage for billing purposes. In a common mode of operation, the SG charges for the total number of IP bytes of an HTTP transaction transferred between a client and a server. The HTTP transaction data is carried by a sequence of IP datagrams. An IP datagram is the portion of a data packet that includes the IP header and the IP payload. The total number of IP bytes in an IP datagram is the sum of the bytes in the IP header and payload, which includes the TCP header and the TCP payload in TCP/IP packets. This number is given in the IP Total Length field in the IP header.

With HTTP 1.0, a TCP session may transport multiple HTTP requests. A TCP session begins with a TCP SYN data packet and ends with a TCP FIN data packet, as is well known in the art. (See for example, W. Richard Stevens, *TCP/IP Illustrated Volume* 1, *The Protocols*, Addison Wesley Professional, Boston, 1994, the entire contents of which are hereby incorporated by reference as if fully set forth herein.) Within the TCP session, the client sends HTTP requests sequentially; e.g., request N+1 is not sent until the client receives the entire response for request N. As a result, the IP bytes for an IP datagram are easily correlated to a single HTTP transaction, and the SG can charge all bytes in an IP datagram to the current HTTP transaction for the TCP session.

With HTTP 1.1, a TCP session may transport multiple HTTP requests, and the client may have multiple HTTP requests outstanding; e.g., request N+1, N+2, N+3 may be sent to the server before the client receives all the data for request N. As a result, a single IP datagram may contain request data or response data for multiple HTTP transactions. The method of assigning the value of the *IP Total Length* field in the IP header to the current HTTP transaction for the TCP session is no longer valid.

In one approach, all IP bytes are assigned to the first transaction in the data packet. For example, wireless devices use a Wireless Application Protocol (WAP) as an application layer protocol with a payload called a protocol data unit (PDU). Several PDUs are concatenated and translated to HTTP in a Wireless Service Gateway (WSG). When the WSG performs billing for concatenated WAP PDUs, it assigns all of the IP bytes to the first transaction in the packet.

While suitable for some purposes, there are disadvantages with the prior art approach. For example, HTTP content providers want to be compensated (or billed) in proportion to the amount of their content accessed by users. Users obtain access to the HTTP content though the network service providers, such as Internet Service Providers (ISPs), who provide the access points and the service gateways. Thus the ISPs want to bill the users or HTTP content providers in proportion to the users' use of the HTTP content. The prior art approach does not track users' access to all HTTP content, just the first HTTP transaction in a data packet. Consequently, the HTTP content provider for the first transaction is over compensated (or over billed); and the HTTP content providers for the second and subsequent transactions in the data packet are under-compensated (or under billed). HTTP content providers for the second and subsequent transactions would prefer to deal with ISPs that provide more differentiated billing platforms. Content providers often charge differentially for content, even from the same server. Some content may be free, some may be charged per transaction instead of per-byte, some may be charged at a different rate than others, all within the same TCP connection. For example, content providers may charge per-byte to browse ring tones, but may have a flat charge per downloaded ring tone. Similarly, text-messages are included in a base rate charged to content providers, but photo messages incur additional charges.

Based on the foregoing description, there is a clear need for techniques that separately account for multiple transactions in the same data packets communicated over a network. In particular, there is a need for techniques that apportion IP bytes to each of multiple HTTP transaction in a single TCP datagram based at least in part on the number of bytes each HTTP transaction includes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for separately accounting for multiple transactions that share the same TCP/IP datagram. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of a content service gateway for mobile, wireless devices that obtain access to the content service gateway through a network access server, but the invention is not limited to this context. In other contexts other servers that act as proxies for content servers employ the techniques of the current invention. Such other servers include WAP 2.0 gateways, and proxy gateways for broadband or dial networks, among others. Furthermore, embodiments of the invention are described in the context of HTTP transactions inside TCP payloads, but the invention may include other transactions within TCP payloads, including but not limited to Real Time Streaming Protocol (RTSP) transactions within TCP payloads.

1.0 NETWORK OVERVIEW

Figure 1:
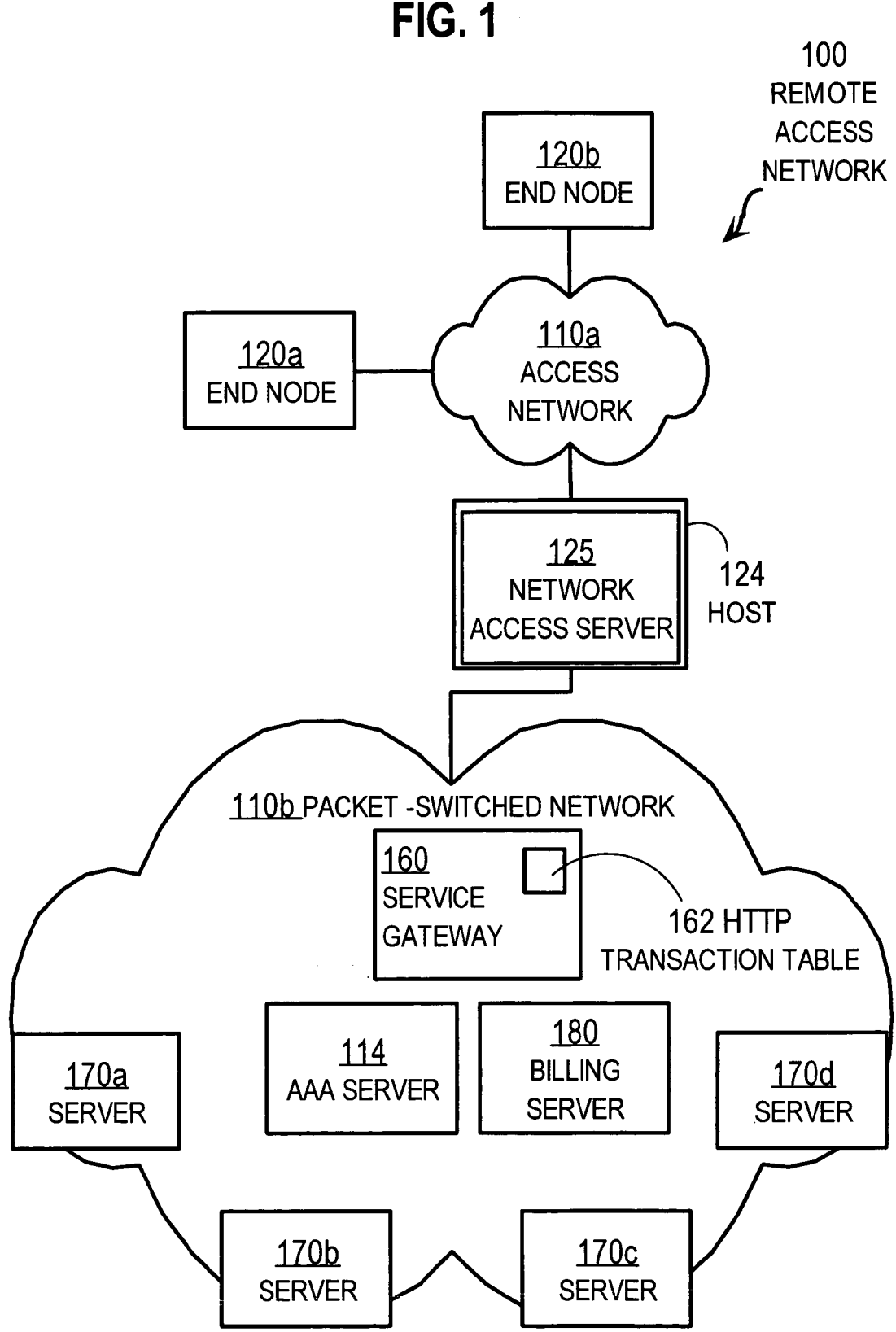
FIG. 1 is a block diagram that illustrates a network with a service gateway configured to separately track HTTP transactions, according to an embodiment.

FIG. 1 is a block diagram that illustrates a remote access network 100 with a service gateway configured to separately track HTTP transactions, according to an embodiment. Network 100 includes an access network 110a, a packet switched network (PSN) 110b, and a network access host 124. Access network 110a may be any network used to access a PSN, including access networks with one or more sub-networks for dial in access, broadband access using digital subscriber line (DSL) infrastructure, electrical or optical cable infrastructure, and wireless infrastructure. End nodes 120a, 120b (collectively referenced hereinafter as end nodes 120) are connected to access network 110a. End nodes are any network nodes that initiate or terminate network communications.

Network access host 124 includes network access server 125 that facilitates communications between end nodes 120 on access network 110a and servers on PSN 110b. PSN 110b includes an AAA server 114, a billing server 180, HTTP content servers 170a, 170b, 170c, 170d (collectively referenced hereinafter as HTTP content servers 170) and content service gateway (SG) 160. Users employ end nodes 120a, 120b to access content servers 170 on PSN 110b through network access server 125. Network access server 125 is configured to route data packets from end nodes 120 through SG 160.

According to an illustrated embodiment, SG 160 includes HTTP transaction table 162 that is described in more detail below with reference to FIG. 5.

Although network 100 is shown for purposes of illustration with a particular number of end nodes 120, access network 110a, network access server 125, service gateway 160, and servers 114, 180, 170, in other embodiments more or fewer such components are included in network 100.

Figure 2:
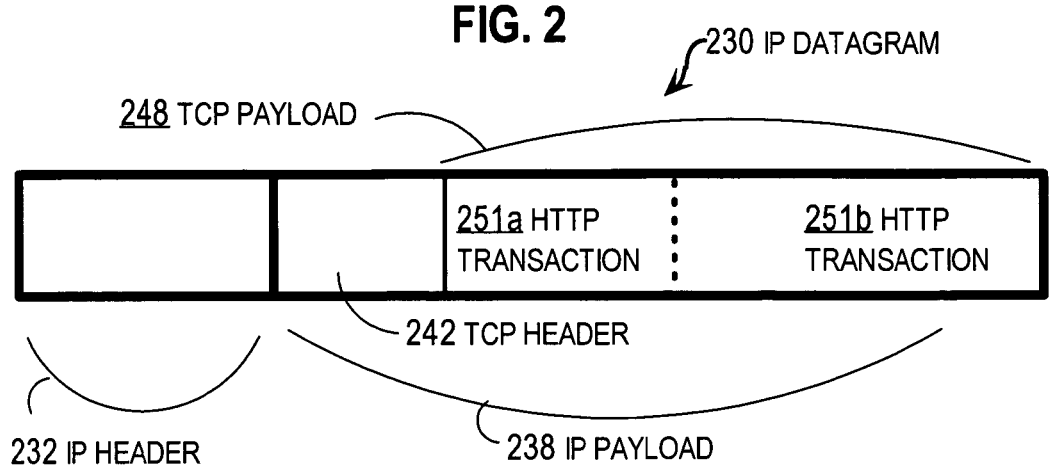
FIG. 2 is a block diagram that illustrates two HTTP transactions in an Internet Protocol (IP) datagram in a data packet communicated over the network, according to an embodiment.

FIG. 2 is a block diagram that illustrates two HTTP transactions in an Internet Protocol (IP) datagram in a data packet communicated over the network, according to an embodiment. A data packet transmitted over network 100 includes IP datagram 230, which is a layer 3 protocol encapsulated in one or more other protocols, such as layer 1, layer 2 or layer 2.5 protocols. IP datagram 230 includes an IP header 232 and an IP payload 238. An IP payload 238 that transmits an HTTP protocol payload includes a TCP (layer 4) data packet that includes a TCP header 242 and a TCP payload 248. The size of the IP header is typically 20 bytes; and the size of the TCP header is also typically 20 bytes. A byte is a collection of binary digits that represents a convenient unit of information. In most embodiments, a byte is eight binary digits (bits).

One or more HTTP requests or responses are included in the TCP payload 248. In the illustrated embodiment, requests or responses for two different HTTP transactions designated HTTP transactions 251a, 251b are included in TCP payload 248. Either a request or a response for each transaction is included in one IP datagram. The complementary response or request for the same transaction is included in a different IP datagram.

Figure 3:
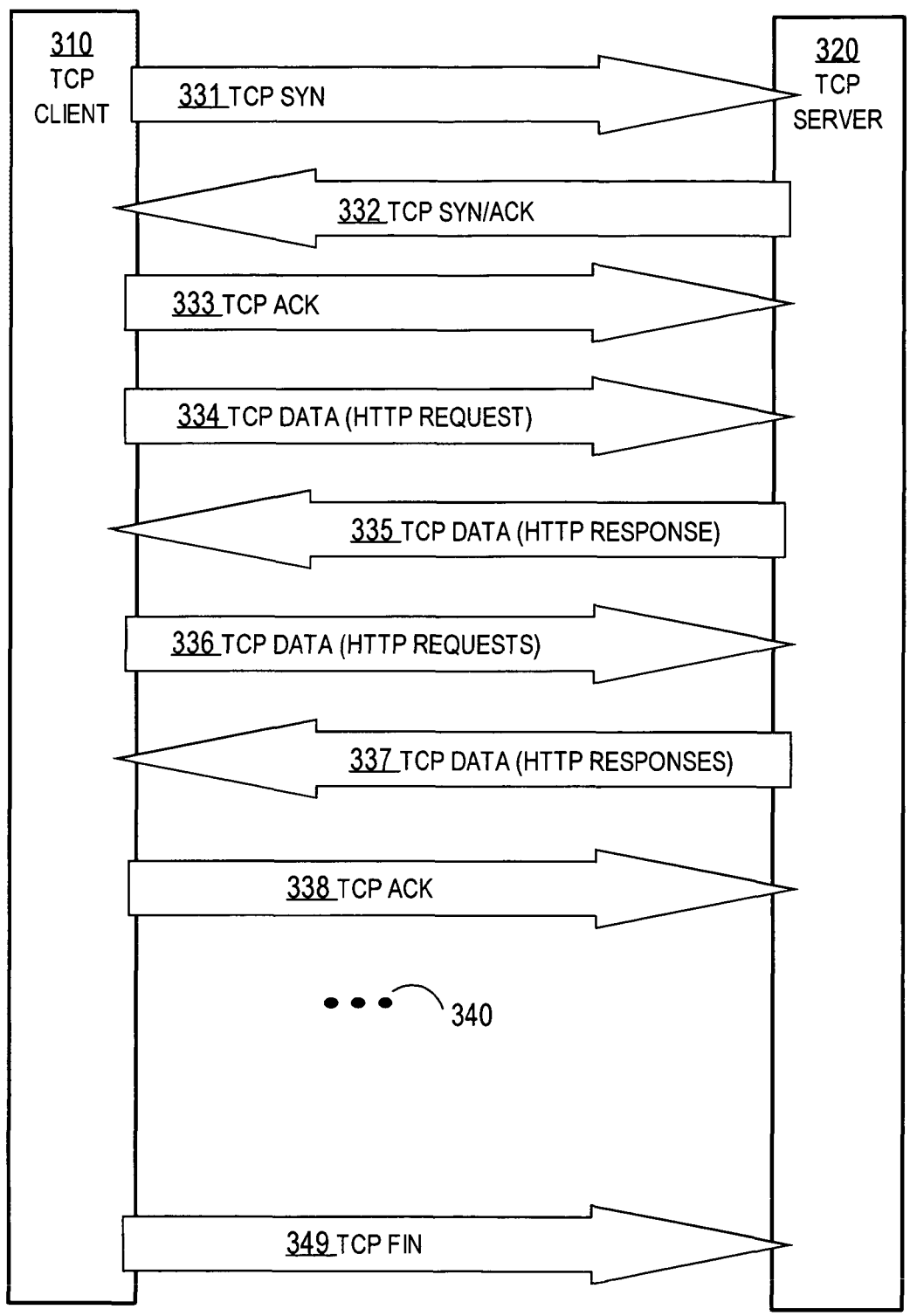
FIG. 3 is a time sequence diagram that illustrates a sequence of TCP data packets exchanged during a TCP session, according to an embodiment.

FIG. 3 is a time sequence diagram that illustrates a sequence of TCP data packets exchanged during a TCP session, according to an embodiment. Time increases downward in FIG. 3. At a particular time a TCP data packet is exchanged between a particular TCP client 310 (e.g., a TCP client executing for network access server 125a) and a particular TCP server (e.g., a TCP server for HTTP content server 170a). Although a particular number of TCP data packets are shown for purposes of illustration, in other embodiments more or fewer TCP data packets are exchanged between TCP client 310 and TCP server 320.

All TCP data packets for a single session are between a TCP client process on a TCP client host and a TCP server process on a TCP server host, as indicated by source and destination port numbers in the TCP header 242, and source and destination IP addresses in the IP header 232, respectively. Any data packet can be recognized as a member of the TCP session based on the source and receiver ports and IP addresses in the TCP and IP headers.

A TCP session begins with a TCP SYN data packet 331 sent from the client 310 to the server 320. A TCP SYN data packet has a set value in a SYN flag field in the TCP header 242 and has no TCP payload. The source and destination ports and IP addresses in the TCP SYN data packet uniquely define a TCP session. In order to provide information to ensure that all data packets sent by the client are received by the server during the session, the TCP SYN data packet includes an arbitrary client initial sequence number in a SEQ # field in the TCP header 242.

The TCP server responds to the TCP SYN data packet from the client with a TCP SYN/ACK data packet 332. A TCP SYN/ACK data packet has the set value in the SYN flag field and has a set value in an ACK (acknowledgement) flag field in the TCP header 242, and has no TCP payload. The SYN flag consumes a single sequence number, that is not associated with a size of the TCP payload. In order to provide information to ensure that all data packets sent by the server are received by the client during the session, the TCP SYN/ACK data packet 332 includes an arbitrary server initial sequence number in the SEQ # field in the TCP header 242. The server also acknowledges the receipt of the TCP SYN message from the client by including in the TCP SYN/ACK data packet the value of the client initial sequence number in an ACK # field in the TCP header 242.

The TCP client responds to the TCP SYN/ACK data packet from the server with a TCP ACK data packet 333. A TCP ACK data packet 333 has the set value in the ACK flag field in the TCP header 242, the next value for the client sequence number in the SEQ # field, and typically has no TCP payload. The client acknowledges the receipt of the TCP SYN/ACK message from the server by including in the TCP ACK data packet the next value of the server sequence number in the ACK # field in the TCP header 242. At this point, both client and server have exchanged information to support the TCP session, including the sequence numbers to be used by each process.

The TCP client initiates an HTTP exchange by sending a TCP data packet 334 to the server using the sequence numbers agreed to in the exchange of the previous three packets. Thus, the data packet 334 includes the value of the client sequence number in the SEQ # field and the server sequence number in the ACK # field. In the TCP payload 230 one or more HTTP requests are included that indicate one or more corresponding resources to be obtained. The request includes a command, a resource identifier and protocol/version, and optionally some additional fields followed by a carriage return (CR) line feed (LF) character pattern. A resource is typically identified using the universal resource identifier (URI) or universal resource locator (URL) naming convention, well known in the art. The TCP payload 230 has a number of bytes determined by the size of the request or requests.

The TCP server responds by sending a TCP data packet 335 to the client acknowledging all the bytes received in the request packet 334 and including at least part of the first resource requested, and as much as all resources requested. Thus, the data packet 335 includes the value of the server sequence number in the SEQ # field and acknowledges the TCP payload received by a value in the ACK # field equal to the client sequence number plus the size of the TCP payload received. Thus the sequence numbers are incremented by the payload size in data packets with non-zero payloads. In the TCP payload 230 of TCP data packet 335 at least a portion of the responses are included. All of the first response is sent by the TCP server 320 before any of the second response is set.

The TCP client responds by sending another TCP data packet 336 to the server acknowledging all the bytes received in the response packet 335 and including zero, one or more additional HTTP requests in TCP payload 230. Another request (and hence another transaction) is indicated by incrementing the sequence number by the number of bytes sent by the client in the previous payloads. Thus if the client initial sequence number were 1000 and if the first request caused a TCP payload of 99 bytes, then the first request would have a sequence number of 1001 and the value in the SEQ # field would be 1100 for the second request. The data packet 336 includes the sequence number, which is incremented by the size of the sent payloads, in the SEQ # field and acknowledges the received TCP payloads by a value in the ACK # field equal to the server initial sequence number plus the size of the TCP payloads received from the server. Thus if the server initial sequence number were 5000 and the first response caused a TCP payload of 900 bytes, then the SEQ # field contents of the first response would be 5001 and the value in the ACK # field of the second TCP request data packet would be 5901.

In an illustrated embodiment, TCP data packet 336 includes two HTTP requests, which appear in TCP payload 248 as HTTP first transaction request 251a and HTTP second transaction request 251b.

A TCP data packet 337 with at least a portion of an HTTP response is next sent by the TCP client server, incrementing the SEQ # and ACK # fields by the sizes of the payloads sent and received, respectively. In an illustrated embodiment, TCP data packet 337 includes two HTTP responses, which appear in TCP payload 248 as HTTP first transaction response 251a and HTTP second transaction response 251b.

The TCP client 310 acknowledges a response received without making a new request by sending a TCP ACK data packet like the TCP ACK data packet 333 described above. In the illustrated embodiment, the TCP ACK data packet 338 is sent in response to the TCP data packet 337. The value in the ACK # field in TCP data packet 337 acknowledges the number of bytes received from the server.

The ellipsis 340 indicates other TCP packets exchanged between TCP client 310 and server 320 during the TCP session.

The session ends explicitly when both the TCP client 310 and the TCP server 320 send TCP FIN packets, and each TCP partner sends a TCP ACK packet to acknowledge reception of the TCP FIN packet. In the illustrated embodiment, the TCP client 310 sends a TCP FIN data packet 349. A TCP FIN data packet has a set value in a FIN flag field in the TCP header 242. A TCP session can end implicitly when more than an idle threshold time has passed since a TCP packet is sent between this client and this server.

2.0 METHOD FOR SEPARATE ACCOUNTING

Figure 4A:
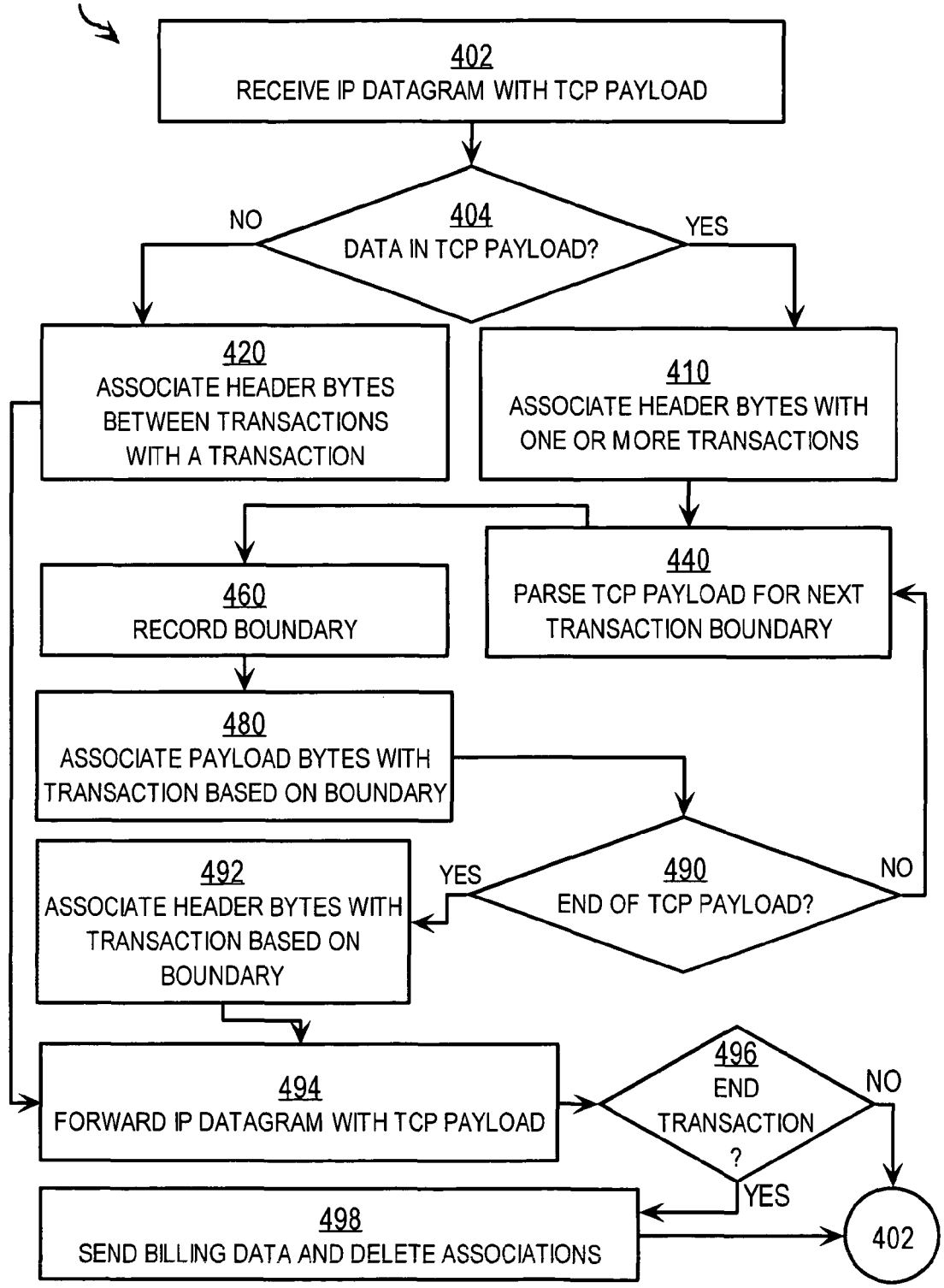
FIG. 4A is a flow diagram that illustrates at a high level a method for separately accounting for multiple HTTP transactions during a TCP session, according to an embodiment.

FIG. 4A is a flow diagram that illustrates at a high level a method 400 for separately accounting for multiple transactions during a TCP session, according to an embodiment. In the illustrated embodiment, the method is implemented at a service gateway disposed to receive all data packets exchanged between a HTTP client (e.g., network access server 125) and an HTTP content server (e.g., content server 170a). In other embodiments the service gateway is disposed to receive all data packets exchanged between a different client and server, such as a RTSP client and server. Although steps are shown in FIG. 4A and subsequent flow diagrams in a particular order for purposes of illustration, in other embodiments the steps may be performed in a different order or overlapping in time or one or more steps may be omitted, or some combination of changes can be made.

According to method 400, a TCP payload is parsed to determine at least one boundary between multiple transactions, and the bytes associated with a transaction depend at least in part on that boundary. In some embodiments, described in more detail with reference to FIGS. 4B, 4C, 4D and 5, the boundary between HTTP transactions is stored as separate TCP sequence numbers for the client-to-server direction and the server-to-client direction.

In step 402 an IP datagram with a TCP payload is received at the service gateway. For example, any TCP data packet illustrated in FIG. 3 is received at SG 160.

In step 404, it is determined whether the TCP payload includes data. If not, control passes to step 420. For example, if the IP datagram holds a TCP SYN or ACK or FIN data packet, then control passes to step 420.

In step 420, IP and TCP header bytes in IP datagrams between transactions are associated with a transaction within a TCP session. A TCP session is uniquely identified by a pair of IP addresses in the IP header, and a pair of port numbers in the TCP header of the IP datagram received in step 402. For example, session initiation bytes are associated with the first transaction to follow; session terminating bytes are associated with the last transaction to precede the session termination; and response acknowledgement bytes are associated with the transaction being acknowledged. Control then passes from step 420 to step 494, described below, to forward the IP datagram to the IP destination. An embodiment of step 420 using TCP sequence numbers and a transaction table to associate header bytes with a transaction is described in more detail below with reference to FIG. 4B and HTTP transactions.

If it is determined in step 404 that the TCP payload includes data, control passes to step 410. In step 410, IP and TCP header bytes in IP datagrams with data are associated with one or more transactions within a TCP session. For example, in some embodiments, all the header bytes in the IP datagram are associated with the first of multiple HTTP transaction in the TCP payload. In some embodiments, all the header bytes in the IP datagram are associated with the last HTTP of multiple HTTP transaction in the TCP payload. In some embodiments, all the header bytes in the IP datagram are divided evenly among multiple HTTP transactions in the TCP payload. In some embodiments, step 410 is omitted in favor of step 492, described in more detail below, to associate header bytes proportionately with multiple HTTP transactions in the IP datagram. An embodiment of step 410 using TCP sequence numbers and a transaction table to associate header bytes with a transaction is described in more detail below with reference to FIG. 4C for HTTP transactions.

In step 440, the TCP payload is parsed for the next boundary between transactions. For example, for HTTP transactions, the parsing may be performed using any or all of the rules set forth in RFC 2616. For example, an HTTP request boundary is based on a CRLF pattern at the end of a request line. Alternatively, an HTTP response boundary is based on a pattern of "HTTP" at the beginning of a new response status-line. The boundary occurs between the last byte of one transaction and the first byte of the next transaction. The CRLF can be considered the last byte of the first transaction or the first byte of the next transaction. The location of the boundary can be indicated in any way. For example, in some embodiments the boundary is indicated by the percentage or fraction of the TCP payload bytes that occurs before the boundary. In some embodiments, the boundary is indicated by the number of the last byte in the first transaction; and in some embodiments, the boundary is indicated by the number of the first byte of the next transaction. For purposes of illustration in the following, the number of the last byte in a transaction indicates the boundary of an HTTP transaction. In some embodiments, the bytes are numbered from the beginning of the payload; in some embodiments, the bytes are numbered from the sequence number in the TCP header, so that byte locations are unique within each direction over the entire TCP session.

In step 460, the location of the boundary is recorded in persistent memory. In some embodiments, the location of the boundary is kept in volatile memory but not stored on a persistent memory, and step 460 is omitted.

In step 480, TCP payload bytes are associated with a transaction based on the boundary. For example, all bytes in the TCP payload between HTTP boundaries are associated with one HTTP transaction. Transactions within a TCP session may be indicated in any manner. In illustrated embodiments, HTTP transactions are numbered by ordinal numbers starting with one for the first HTTP transaction within a session. As stated above, a session is uniquely indicated by a pair of IP addresses and a pair of TCP port numbers. Thus the bytes associated with the first HTTP request in TCP data packet 334 are associated with a first HTTP transaction in a TCP session identified by port 80 and the IP address of network server host 124 and the IP address of the host for server 170a.

Embodiments of steps 440, 460, 480 using TCP sequence numbers and a transaction table to associate TCP payload bytes with a transaction are described in more detail below with reference to FIG. 4D for HTTP transactions.

In, step 490 it is determined whether the end of the TCP payload is reached. If not control passes back to step 440 to find the next boundary in the TCP payload. If another boundary is found, control passes back to step 460. If no other boundaries are found in the TCP payload, control passes back to step 490 and thence to step 492.

In step 492, the header bytes of the current IP datagram are associated with one or more HTTP transactions based on the boundary locations. For example, in some embodiments, the portion of the header bytes associated with each transaction is proportional to the portion of the payload between the boundaries for that transaction. In some embodiments, step 492 is omitted and header bytes are associated with HTTP transactions in step 410 arbitrarily or based on the number of transactions rather the relative sizes of the transactions, as determined by their boundaries.

In step 493, the IP datagram is forwarded to the destination IP address.

In step 496, it is determined whether a transaction is completed. The SG maintains the associations between transactions and byte counts for a sufficiently long time to allow TCP retransmissions on open TCP sessions to be counted against the correct transaction. When TCP payloads in both directions involve only transactions after a particular transaction, the particular transaction is complete. If the transaction has not completed, control passes back to step 402 to receive the next IP datagram for the transaction or the TCP session.

In some embodiments, step 496 includes determining whether a TCP session has ended. For example, it is determined whether TCP FIN data packets, such as data packet 349, have been received and acknowledged by both client and server. If the TCP session has not ended, control passes back to step 402 to receive the next IP datagram for the TCP session.

When the transaction or TCP session ends, control passes to step 498. In step 498 billing data based on the byte counts associated with a completed transaction are sent to a billing server, such as billing server 180. Billing data can be derived from the byte counts in any manner. For example, in some embodiments the billing data are the raw byte counts. In some embodiments, the billing data are the byte counts multiplied by a billing rate or weighted by some other factors. After the billing data are successfully sent, the association of the transaction with the byte count is deleted from memory. When the TCP session ends, billing data for the last transaction is sent and the association of the last transaction with the byte counts is deleted from memory.

Control passes back to step 402 to receive another IP datagram, such as to complete other transactions or to start a new transaction or to start a new TCP session.

3.0 METHOD USING TCP SEQUENCE NUMBERS

Figure 5:
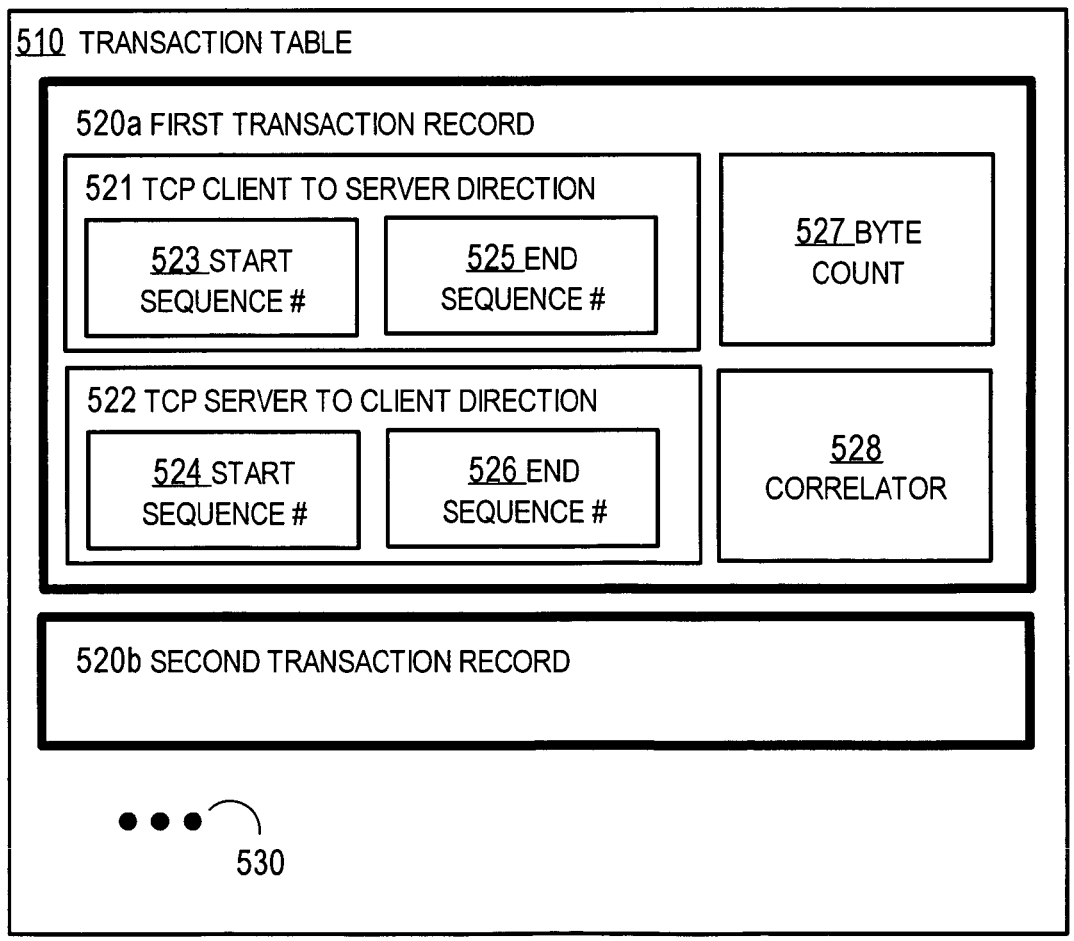
FIG. 5 is a block diagram that illustrates an HTTP transaction table data structure, according to an embodiment.

FIG. 5 is a block diagram that illustrates a transaction table 510, according to an embodiment. The transaction table 510 is a data structure for separately storing associations between byte counts and different transactions in the same IP datagrams.

In the illustrated embodiment, transaction table 510 includes a first transaction record 520a, a second transaction record 520b, and zero or more other transaction records, designated by ellipsis 530, collectively referenced hereinafter as transaction records 520. Each transaction record 520 includes a TCP client-to-server direction field 521, a TCP server-to-client direction field 522, a byte count field 527, and a correlator field 528. The TCP client-to-server direction field 521 includes a start sequence # field 523 and an end sequence # field 525. The TCP server-to-client direction field 522 includes a start sequence # field 524 and an end sequence # field 526.

The start sequence # field 523 holds data that indicates the first TCP payload byte in a given transaction for the client-to-server direction, numbered from the sequence number in the TCP header so that byte locations are unique in that direction for an entire TCP session. Similarly, the start sequence # field 524 holds data that indicates the first TCP payload byte in the same transaction for the opposite (server-to-client) direction, numbered from the sequence number in the TCP header so that byte locations are unique in that direction for an entire TCP session.

The end sequence # field 525 holds data that indicates the last TCP payload byte in a given transaction for the client-to-server direction, numbered from the sequence number in the TCP header. Similarly, the end sequence # field 526 holds data that indicates the last TCP payload byte in the same transaction for the opposite (server-to-client) direction, numbered from the sequence number in the TCP header.

The byte count field 527 holds data that indicates the number of bytes associated with the transaction, which is used to form billing records. In some embodiments, byte count field 527 includes one byte count field for client-→server direction included in the TCP client to server direction field 521 and a second byte count filed for server-→client direction included in the TCP server-to-client direction field 522. For simplicity of illustration it is assumed in the following that there is a single byte count field that holds the total number of bytes in both directions.

The correlator field 528 holds data that indicates other information about the transaction used to form billing records, such as the URL of the resource delivered, the content provider, the billing rate for that resource, the user associated with the TCP client, and user profile information, such as the level of service paid for. In a preferred embodiment, the correlator 528 holds a pointer to a record in another table that stores the other information about the transaction.

Figure 4B:
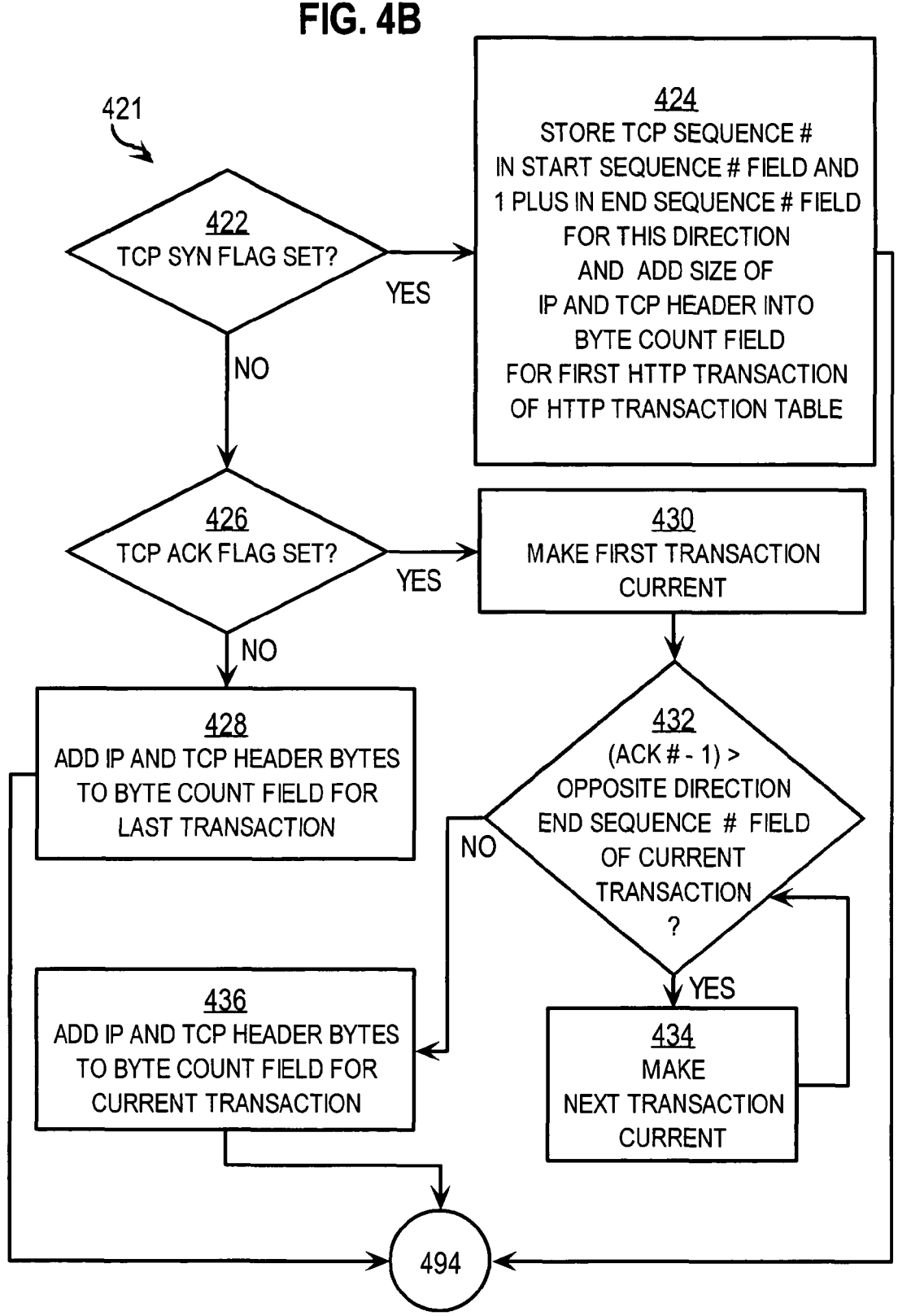
FIGS. 4B, 4C, 4D are flow diagrams that illustrate in more detail steps of the method of FIG. 4A that uses TCP sequence numbers to separately account for multiple HTTP transactions, according to various embodiments.

FIG. 4B is a flow diagram that illustrate in more detail step 420 of the method of FIG. 4A using TCP sequence numbers to separately account for multiple HTTP transactions, according to an embodiment 421. Step 421 is performed for a TCP payload without HTTP data, such as for SYN, ACK and FIN data packets. According to step 421, header bytes to set up the session are associated with the first HTTP transaction in the TCP session; header bytes to acknowledge a transaction are associated with that transaction; and other header bytes are associated with the most recent (last) transaction in the TCP session. Step 421 includes steps 422, 424, 426, 428, 430, 432, 434, 436.

To illustrate the workings and results of step 421 and subsequent steps, described below, it is assumed that an example TCP session, as given by data packets 331 through 338, is routed through SG 160. SG 160 examines the data packets 331 through 338 and determines billing data for sending to billing server 180. It is further assumed, for purposes of illustration, that the client arbitrary initial sequence number is 1 and the server arbitrary initial sequence number is 100. It is further assumed that data packet 334 includes one HTTP request of 37 bytes; that data packet 335 includes one HTTP response of 42 bytes; that data packet 336 includes two HTTP requests of 15 bytes and 12 bytes, respectively; and that data packet 337 includes two HTTP responses of 80 bytes and 70 bytes respectively. These relevant example values are summarized in Table 1.

TABLE 1

Example properties of data packets in a TCP session.

| packet | type | direction | SEQ # | ACK # | transactions | sizes |
|---|---|---|---|---|---|---|
| 331 | SYN | C → | 1 | 0 | 0 | — |
| 332 | SYN/ACK | ← S | 100 | 1 | 0 | — |
| 333 | ACK | C → | 2 | 101 | 0 | — |
| 334 | DATA - REQUEST | C → | 2 | 101 | 1 | 37 |

TABLE 1-continued

Example properties of data packets in a TCP session.

| packet | type | direction | SEQ # | ACK # | transactions | sizes |
|---|---|---|---|---|---|---|
| 335 | DATA - RESPONSE | ← S | 101 | 38 | 1 | 42 |
| 336 | DATA - REQUESTS | C → | 39 | 142 | 2 | 15, 12 |
| 337 | DATA - RESPONSES | ← S | 143 | 65 | 2 | 80, 70 |
| 338 | ACK | C → | 66 | 292 | 0 | — |

The total number of IP bytes sent in the example eight IP datagrams in these eight data packets is 8*40+37+42+15+12+80+70=576 bytes, to be apportioned among three HTTP transactions started by the one request in packet 334 and the two requests in packet 336.

It is assumed that during step 402 a unique TCP session is identified in the IP datagram received and that there is not already a HTTP transaction table 510 for this TCP session. Therefore an HTTP transaction table 510 is generated for this unique TCP session with no records. It is determined that the client has the IP address of the source IP address (e.g., network access server host 124) designated IPclient, and the server has the destination IP address (e.g., the host for server 170a) designated IPserver in this first IP datagram for this TCP session. The direction of any data packet is then determined by whether the IPclient value or the IPserver value occupies the source IP address field of the IP datagram.

In step 422, it is determined whether the SYN flag is set in the TCP header. If so, control flows to step 424 to store data in a first HTTP transaction record.

In step 424 the TCP sequence # of the TCP header is stored in the start sequence # field (e.g., 523) and that value plus 1 (because SYN advances the sequence number) is stored in the end sequence # field (e.g., 525) for the direction in the first HTTP transaction record 520a. If the first HTTP transaction record does not yet exist, it is generated during step 424 with null values for the opposite direction and zero for the byte count. The size of the IP header (20 bytes) and the TCP header (20 bytes) and the TCP payload (0 byte) is added to the byte count field 527 of the first HTTP transaction record 520a. Thus 40 bytes is added to the contents of the byte count field 527. Control then passes to step 494 to forward the IP datagram to its destination IP address.

If it is determined in step 422 that the SYN flag is not set in the TCP header, then control passes to step 426. In step 426 it is determined whether the ACK flag is set in the TCP header. If so, control flows to step 430 and following steps, described below to add the header bytes for this IP datagram to an HTTP transaction, if any, associated with the ACK. If not, control passes to step 428. For example, if the TCP FIN flag is set in the TCP header, control passes to step 428.

In step 428, the bytes for the IP and TCP headers are added to the byte count field 527 for the last transaction record 520 in the HTTP transaction table 510. Control then passes to step 494 to forward the data packet to the destination IP address.

In step 430, the first HTTP transaction record is made the current transaction record. Control passes to step 432. In step 432 it is determined whether one less than the ACK value is greater than the value in the end sequence # field in the opposite direction field of the current transaction. If so, the ACK is not acknowledging the current transaction but a later one. Control passes to step 434 to make the next HTTP transaction record the current transaction record. The control passes back to step 432 to determine whether the ACK datagram is acknowledging the HTTP transaction of the current transaction record.

If it is determined in step 432 that one less than the ACK value is not greater than the value in the end sequence # field in the opposite direction field of the current transaction, then the ACK datagram is acknowledging the HTTP transaction for the current transaction record. Control then passes to step 436.

In other embodiments the ACK value is compared to the sequence ranges for the opposite direction in a different order, e.g., starting with the last HTTP record in the table and proceeding to the first.

In step 436, the bytes for the IP and TCP headers are added to the byte count field 527 for the current transaction record 520 in the HTTP transaction table 510. Control then passes to step 494 to forward the data packet to the destination IP address.

The results of step 421 for the first few of the example eight data packets are shown in Table 2A. In Table 2A the direction from the client is indicated by the expression "from C"; and the direction from the server is indicated by the expression "from S." These results are accumulated as follows. Data packet 331 is received in step 402 and control is passed to step 421 by step 404 because it has no HTTP payload. In step 422 it is determined that the SYN flag is set, so control passes to step 424. In step 424 the value "1" in the TCP header SEQ field is stored in the start sequence # field 523 and that value plus 1 is stored in the end sequence # field 525 for the client-to-server direction in the first HTTP transaction record 520a. The size of the IP datagram (40 bytes) is added to the byte count field 527, which is currently empty. Control passes to step 494 to forward the IP datagram. Data packet 332 is received in step 402 and directed to step 421 by step 404 because it has no HTTP payload. In step 422 it is determined that the SYN flag is set, so control passes to step 424. In step 424 the TCP header SEQ # field value "100" is stored in the start sequence # field 523 and one plus that amount is stored in the end sequence # field 525 for the server to client direction in the first HTTP transaction record 520a. The size of the IP datagram (40 bytes) is added to the byte count field 527, which currently hold the value 40. Control passes to step 494 to forward the IP datagram. Data packet 333 is received in step 402 and directed to steps 421 by step 404 because it has no HTTP payload. In step 422 it is determined that the SYN flag is not set, so control passes to step 426. In step 426 it is determined that the ACK flag is set, so control passes to step 430 to make the record #1 the current transaction record. Data packet 333 is from the client direction and has an ACK value of "101." In step 432 the ACK value minus one (100) is compared to the value in the end sequence # field for the opposite direction (i.e., from server) in the current transaction record. That value is "101." Since 100 is not greater than 101, control passes to step 436. In step 436 the size of the IP datagram (40 bytes) is added to the byte count field 527, which currently hold the value 80. Control passes to step 494 to forward the IP datagram.

TABLE 2A

Contents of HTTP Transaction Table after first three example IP datagrams.

| Record # | Start Seq # from C | End Seq # from C | Start Seq # from S | End Seq # from S | Byte Count | Correlator |
|---|---|---|---|---|---|---|
| 1 | 1 | 2 | 100 | 101 | 40 + 40 + 40 | Pointer A |

In some embodiments a record in another data structure is generated to describe the first HTTP transaction. At this point in time, the client and server IP addresses are known and a profile for the user of the client may be known based on data packets exchange with the AAA server 114 when the user signed onto the network 110b using the client host, as is well known in the art. It is assumed for the purposes of illustration that the information known about the transaction is stored in the other data structure, called herein a transaction description data structure. It is further assumed that a pointer to this information for the current transaction in the transaction description data structure is designated by the expression "pointer A." The value of pointer A is stored in the correlator field 528 of the first transaction record.

Figure 4C:
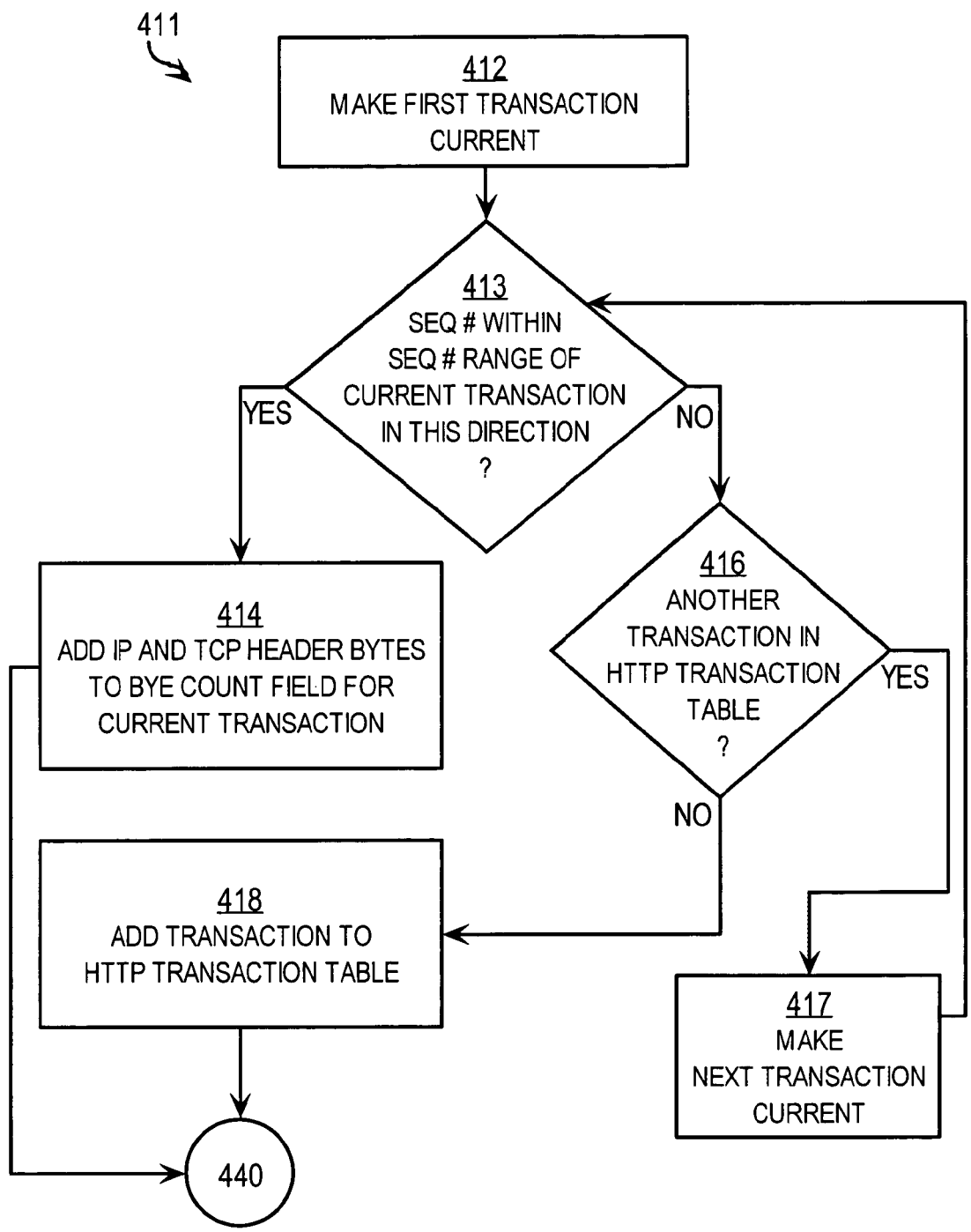

FIG. 4C is a flow diagram that illustrates in more detail step 410 of the method of FIG. 4A using TCP sequence numbers to separately account for multiple HTTP transactions, according to an embodiment 411. Step 411 is performed for a TCP payload with HTTP data, such as payloads with HTTP requests and responses. According to step 411, header bytes with HTTP data are associated with the first HTTP transaction in the TCP payload. Step 411 includes steps 412, 413, 414, 416, 417, 418.

In step 412, the first HTTP transaction record 520a in the HTTP transaction table 510 is made the current transaction record. In step 413, it is determined whether the value in the SEQ # field of the TCP header falls within the sequence number range for the same direction in the current transaction record. If so, control passes to step 414. In step 414 the header bytes are added to the byte count field of the current transaction record. Control then passes to step 440, and following steps, to determine the boundary between HTTP transactions, if any, in the TCP payload.

If it is determined in step 413 that the value in the SEQ # field of the TCP header does not fall within the sequence number range for the same direction in the current transaction record, then control passes to step 416. In step 416, it is determined whether there is another transaction record 520 in the transaction table 510. If so, control passes to step 417. In step 417, the next transaction record 520 in the transaction table 510 is made the current transaction record and control passes back to step 413.

Steps 413, 416, 417 search the table 510 to find a transaction with a sequence number range that encompasses the value of the SEQ # in the TCP header. If such a record is found, control passes to step 414 to add the header bytes to the byte count for that record. In other embodiments the SEQ # value is compared to the sequence ranges for the same direction in a different order, e.g., starting with the last HTTP record in the table and proceeding to the first. If no such record is found, a new transaction record 520 is added to the transaction table in step 418, as described next, for the illustrated embodiment.

If it is determined in step 416 that there is no other transaction record 520 in the transaction table 510, then control passes to step 418. This occurs if the value in the SEQ # field of the TCP header does not fall within the range of sequence numbers for any record 520 in the table 510. In step 418 a new transaction record 520 is added to the HTTP transaction table 510. The value of the SEQ # field in the TCP header is stored in the start sequence # field (e.g., 523) and in the end sequence # field (e.g., 535) of the new transaction record 520. A value for the opposite direction start and end sequence # fields is determined by adding one to the value in the end sequence # field for the opposite direction of the previous transaction record. The header bytes are added to the byte count field 527. Control then passes to step 440, and following steps, to determine the boundary between HTTP transactions, if any, in the TCP payload.

The results of step 411 for the next of the example eight data packets are shown in Table 2B. These results are accumulated as follows. Data packet 334 is received in step 402 and control is passed to step 411 by step 404 because it has an HTTP payload. Data packet 334 has a SEQ # field value of 2 and is in the direction from the client. In step 412 the first HTTP transaction record 520a is made the current transaction record. In step 413, it is determined that this value "2" is within the sequence number range in the direction from the client for the first transaction record, which is "1 to 2." Therefore control passes to step 414. In step 414, the 40 header bytes are added to the value 120 already in the byte count field 527 for the current transaction 520. Control then passes to step 440.

TABLE 2B

Contents of HTTP Transaction Table after processing the header of the fourth example IP datagram.

| Record # | Start Seq # from C | End Seq # from C | Start Seq # from S | End Seq # from S | Byte Count | Corre-lator |
|---|---|---|---|---|---|---|
| 1 | 1 | 2 | 100 | 101 | 120 + 40 | Pointer A |

Figure 4D:
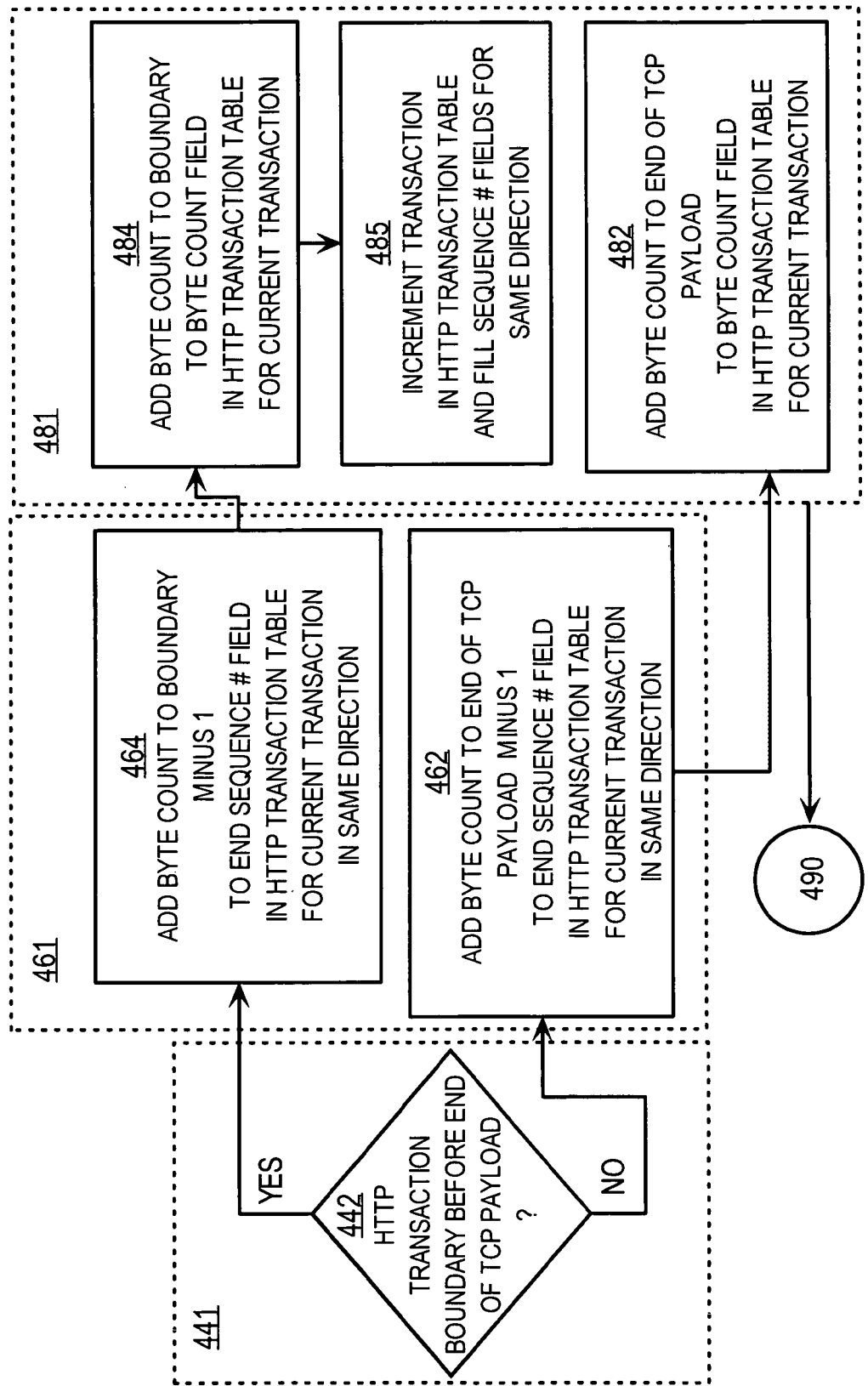

FIG. 4D is a flow diagram that illustrates in more detail steps 440, 460, 480 of the method 400 using TCP sequence numbers to separately account for multiple HTTP transactions, according to an embodiment. In FIG. 4D, step 441 is an embodiment of step 440; step 461 is an embodiment of step 460; and step 481 is an embodiment of step 480. Step 441 includes step 442; step 461 includes steps 462, 464; and step 481 includes steps 482, 484, 485.

In step 442, it is determined whether there is an HTTP transaction boundary before the end of the TCP payload. Any method may be used to determine the boundary, as described above.

If there is no HTTP transaction boundary before the end of the TCP payload, then control passes to 462 to treat the rest of the TCP payload as part of the current transaction. In step 462, the byte count to the end of the TCP payload minus one is added to the end sequence # field of the current transaction in the same direction. In a particular embodiment, the TCP SEQ #+max{0, TCP payload−1} is compared to current value in the end sequence # field. If TCP SEQ #+TCP payload is greater than the current value in the end sequence # field, then it becomes the new end sequence #. This would handle retransmissions, out of order packets and other phenomena. It is noted that the sequence number space can wrap and should be handled by the algorithm in at least some embodiments. The value in the end sequence # field marks the last byte in terms of sequence numbers for the current transaction as the boundary for the transaction. Control passes to step 482. In step 482, the byte count to the end of the TCP payload is added to the byte count for the current transaction. Control then passes to step 490 which determines that the end of the TCP payload has been reached and passes control to steps 492 and 494, described above. Step 492 associates header bytes with HTTP transactions based on the boundary determined in step 460 and is omitted in the illustrated embodiment, which associates all header bytes with the first transaction in the TCP payload. Step 494 forwards the IP datagram to the destination IP address.

The results of steps 462, 482 for IP datagrams with no HTTP transaction boundaries are shown in Table 2C after processing data packets 334, 335. These results are accumulated as follows. It is determined in step 441 that no HTTP transaction boundary is found in the TCP payload of data packet 334. Therefore control passes to step 462. In step 462 the byte count to the end of the TCP payload minus 1 is added to the end sequence # field in the same direction for the current transaction record. The current transaction record, as described above for step 411 is the first transaction record 520a. The byte count in TCP payload to the end of the TCP payload is 37 bytes for data packet 334 and the direction is from the client, as shown in Table 1. Thus 37-1 is added to the end sequence # field (value 2) for the client to server direction. In step 482, 37 is added to the byte count field.

TABLE 2C

Contents of HTTP Transaction Table after processing five example IP datagrams.

| Record # | Start Seq # from C | End Seq # from C | Start Seq # from S | End Seq # from S | Byte Count | Corre-lator |
|---|---|---|---|---|---|---|
| 1 | 1 | 38 | 100 | 142 | 160 + 37 + 40 + 42 | Pointer A |

Similarly, data packet 335 is received in step 402 and control is directed to steps 411 by step 404 because it has an HTTP payload. Data packet 335 has a SEQ # field value of 101 and is in the direction from the server. During step 411, 40 is added to the byte count for the first transaction in a manner similar to the manner described above for data packet 334. The byte count in TCP payload to the end of the TCP payload is 42 bytes for data packet 335. Thus 42-1 is added to the end sequence # field (value 101) for the server to client direction. In step 482, 42 is added to the byte count field.

Further details of the first transaction, such as the URL of the requested resource, are determined based on the request in the HTTP data and added to the transaction description data structure pointed to by pointer A.

If it is determined in step 442 that there is an HTTP transaction boundary before the end of the TCP payload, then control passes to 464. In step 464, the maximum of 0 and the byte count to the boundary minus 1 is added to the end sequence # field of the current transaction in the same direction. This marks the last byte in terms of sequence numbers for the current transaction as the boundary for the transaction. Control passes to step 484. In step 484, the byte count to the boundary is added to the byte count for the current transaction.

Control then passes to step 485 to increment the transaction record. If there is not a transaction record 520 following the current transaction record, then a new transaction record is added to the transaction table 510. In step 485, one is added to the value in the end sequence # field of the previous transaction record and the incremented value is stored in the start sequence # field and in the end sequence # field of the current transaction record. Control passes to step 490. In step 490 it is determined whether the end of the TCP payload is reached; and, if not, control passes back to step 441 to find another boundary, if any.

Further workings of steps 411, 441, 461, 481 are shown in Table 2D and Table 2E after processing data packets 336, 337, respectively, with HTTP transaction boundaries.

The results in Table 2D are accumulated as follows. Data packet 336 is received in step 402 and control is directed to steps 411 by step 404 because it has an HTTP payload. Data packet 336 has a SEQ # field value of 39 and is in the direction from the client. In step 412 the first HTTP transaction record 520a is made the current transaction record. In step 413, it is determined that this SEQ # field value "39" is not within the sequence number range in the direction from the client for the first transaction record, which is "1 to 38." Therefore control passes to step 416. In step 416 it is determined that there is no other transaction record 520 in the table 510, so control passes to step 418. In step 418 a second transaction record 520b is added to the transaction table 510, and the value "39" in the SEQ # field of the TCP header is stored in the start and end sequence # fields for the client to server direction. A value for the opposite direction start and end sequence # fields is obtained by adding one to the value 142 in the end sequence # field for the opposite direction of the first transaction record. Also in step 418, the 40 header bytes are added to the byte count field 527 for the second HTTP transaction record 520b. Another record is also added to the transaction description data structure and pointed to by pointer B. Pointer B is stored in the correlator field 528 of the second data record. Control then passes to embodiment 441 of step 440.

TABLE 2D

Contents of HTTP Transaction Table after processing six example IP datagrams.

| Record # | Start Seq # from C | End Seq # from C | Start Seq # from S | End Seq # from S | Byte Count | Correlator |
|---|---|---|---|---|---|---|
| 1 | 1 | 38 | 100 | 142 | 279 | Pointer A |
| 2 | 39 | 39 + 15 − 1 | 143 | 143 | 40 + 15 | Pointer B |
| 3 | 53 + 1 | 53 + 1 + 12 − 1 | | | 12 | Pointer C |

In step 441, it is determined in step 442 that there is an HTTP transaction boundary before the end of the payload. As indicated in Table 1, data packet 336 includes one request in the first 15 bytes of the TCP payload, and a second request in the last 12 bytes of the TCP payload. Control passes to step 464. In step 464 the 15 bytes to the boundary minus 1 are added to the value "39" in the end sequence # field in the second HTTP transaction record to give a new value of "53." In step 484 the 15 bytes to the boundary are added to the byte count field. Control then passes to step 485 to increment the transaction record for the next HTTP transaction. Since there is no third HTTP transaction record in the HTTP transaction table 510 at this time, a third HTTP transaction record 520 is added to the table and filled with null values during step 485. In step 485, "1" is added to the value (53=39+15−1) in the end sequence # field of the previous transaction and stored in the start sequence # field and in the end sequence # field of the third transaction. Control then passes to step 490 and back to step 441.

Back in step 441 it is determined that there is no further HTTP transaction boundary in the TCP payload. Therefore control passes to step 462 where the 12 bytes to the end of the TCP payload minus 1 are added to the end sequence # field of the third transaction and step 482 where the 12 bytes are added to the byte count field. Thus the values displayed in Table 2D are generated.

The results in Table 2E are accumulated as follows. Data packet 337 is received in step 402 and directed to steps 411 by step 404 because it has an HTTP payload. Data packet 337 has a SEQ # field value of 143 and is in the direction from the server, as shown in Table 1. In step 412 the first HTTP transaction record 520a is made the current transaction record. In step 413, it is determined that this value "143" is not within the sequence number range in the direction from the server for the first transaction record, which is "100 to 142." Therefore control passes to step 416 and 417 to increment to the next record 520. In step 413, it is determined that this value "143" is within the sequence number range in the direction from the server for the second transaction record, which is "143 to 143." Control passes to step 414 to add the header bytes to the byte count field. Thus 40 bytes are added to the second transaction. Control then passes to embodiment 441 of step 440.

TABLE 2E

Contents of HTTP Transaction Table after processing seven example IP datagrams.

| Record # | Start Seq # from C | End Seq # from C | Start Seq # from S | End Seq # From S | Byte Count | Correlator |
|---|---|---|---|---|---|---|
| 1 | 1 | 38 | 100 | 142 | 279 | Pointer A |
| 2 | 39 | 53 | 143 | 143 + 80 − 1 | 55 + 40 + 80 | Pointer B |
| 3 | 54 | 65 | 222 + 1 | 222 + 70 | 12 + 70 | Pointer C |

In step 441, it is determined that there is an HTTP transaction boundary before the end of the payload. As indicated in Table 1, data packet 337 includes one response in the first 80 bytes of the TCP payload, and a second response in the last 70 bytes of the TCP payload. Control passes to step 464. In step 464 the 80 bytes to the boundary minus 1 are added to the value "143" in the end sequence # field in the second HTTP transaction record to give a new value of "222." In step 484 the 80 bytes to the boundary are added to the byte count field. Control then passes to step 485 to increment the transaction record for the next HTTP transaction. In step 485, "1" is added to the value (222) in the end sequence # field of the previous transaction and stored in the start sequence # field and in the end sequence # field of the third transaction. Control then passes to step 490 and back to step 441.

Back in step 441 it is determined that there is no further HTTP transaction boundary in the TCP payload. Therefore control passes to step 462 where the 70 bytes to the end of the TCP payload minus 1 are added to the end sequence # field of the third transaction and step 482 where the 70 bytes are added to the byte count field of the third transaction. Thus the values displayed in Table 2E are generated.

The 40 bytes in the final ACK data packet 338 are then added according to step 421. Data packet 338 is received in step 402 and directed to step 421 by step 404 because it has no HTTP payload. In step 422 it is determined that the SYN flag is not set, so control passes to step 426. In step 426 it is determined that the ACK flag is set, so control passes to step 430 to make the record #1 the current transaction record. Data packet 338 is from the client direction and has an ACK value of "292." In step 434 the ACK value minus one (291) is compared to the value in the end sequence # field for the opposite direction (i.e., from server) in the current transaction record. In the first record, that value is "38." Since 291 is greater than 38, control passes to step 432 to increment the transaction record number. In the third transaction the end sequence # field for the opposite direction value is "292." Since 291 is not greater than 292, control passes to step 436. In step 436 the size of the IP datagram (40 bytes) is added to the byte count field 527 for the third transaction, which currently holds the value 82, bringing the byte count for the third transaction to 122. Control passes to step 494 to forward the IP datagram. The state of the transaction table after the first eight IP datagrams of the TCP session is shown in Table 3.

TABLE 3

Contents of HTTP Transaction Table after processing eight example IP datagrams.

| Record # | Start Seq # from C | End Seq # from C | Start Seq # from S | End Seq # from S | Byte Count | Correlator |
|---|---|---|---|---|---|---|
| 1 | 1 | 38 | 100 | 142 | 279 | Pointer A |
| 2 | 39 | 53 | 143 | 222 | 175 | Pointer B |
| 3 | 54 | 65 | 223 | 292 | 122 | Pointer C |

As shown in Table 3, the 578 bytes in the eight example IP datagrams are distributed among the three transactions based at least in part on boundaries for HTTP transactions within the same IP datagrams. In prior art approaches, the 122 bytes here associated with the third transaction would be all associated with the second transaction; and no bytes would be associated with the third transaction.

It is noted here that after the ACK message in data packet 338, the third transaction may still be open. For example, another data packet might be sent from server 320 with additional response data for the third transaction.

During step 498 shown in FIG. 4A, after a transaction is completed billing data based on the byte count is sent to a billing server and associations are deleted. As stated above, a service gateway should maintain the associations, such as the HTTP transaction records 520 in HTTP transaction table 510, for a sufficiently long time to allow TCP retransmissions on open TCP sessions to be counted against the correct HTTP transaction. In embodiments using sequence number ranges to separate HTTP transactions, a transaction may be considered completed when the values in the TCP SEQ # field in both directions are greater than the end sequence number by the TCP window size. It is assumed for purposes of illustration that the TCP window size in the client-to-server direction is 16000 bytes and the TCP window size in the server-to-client direction is 32000. Then HTTP transaction record 520a for the first HTTP transaction can be removed when the value in the SEQ # field for the client-to-server direction is greater than 16038 and the value in the SEQ # field for the server-to-client direction is greater than 32142.

Using the method 400 and structure 510 described above, IP datagram byte counts are distributed among different HTTP transactions. It is anticipated that IP datagram counts can similarly be distributed among other transactions carried in TCP data packets. For example, in some embodiments, IP datagram counts are distributed among RTSP transactions. RTSP transactions are defined in RFC 2326, the entire contents of which are hereby incorporated by reference as if fully set forth herein. In some embodiments, audio streams are billed at a different rate than video streams. In some embodiments, billing is based on start and stop clock times, with one rate for start to stop of a PAUSE operation and a different rate for start to stop of a PLAY operation. In such embodiment, the HTTP transaction table 510 is replaced with a similar table for RTSP transactions, and a method similar to method 400 associates header and payload bytes with RTSP transactions instead of with HTTP transactions.

4.0 IMPLEMENTATION MECHANISMS—HARDWARE OVERVIEW

Figure 6:
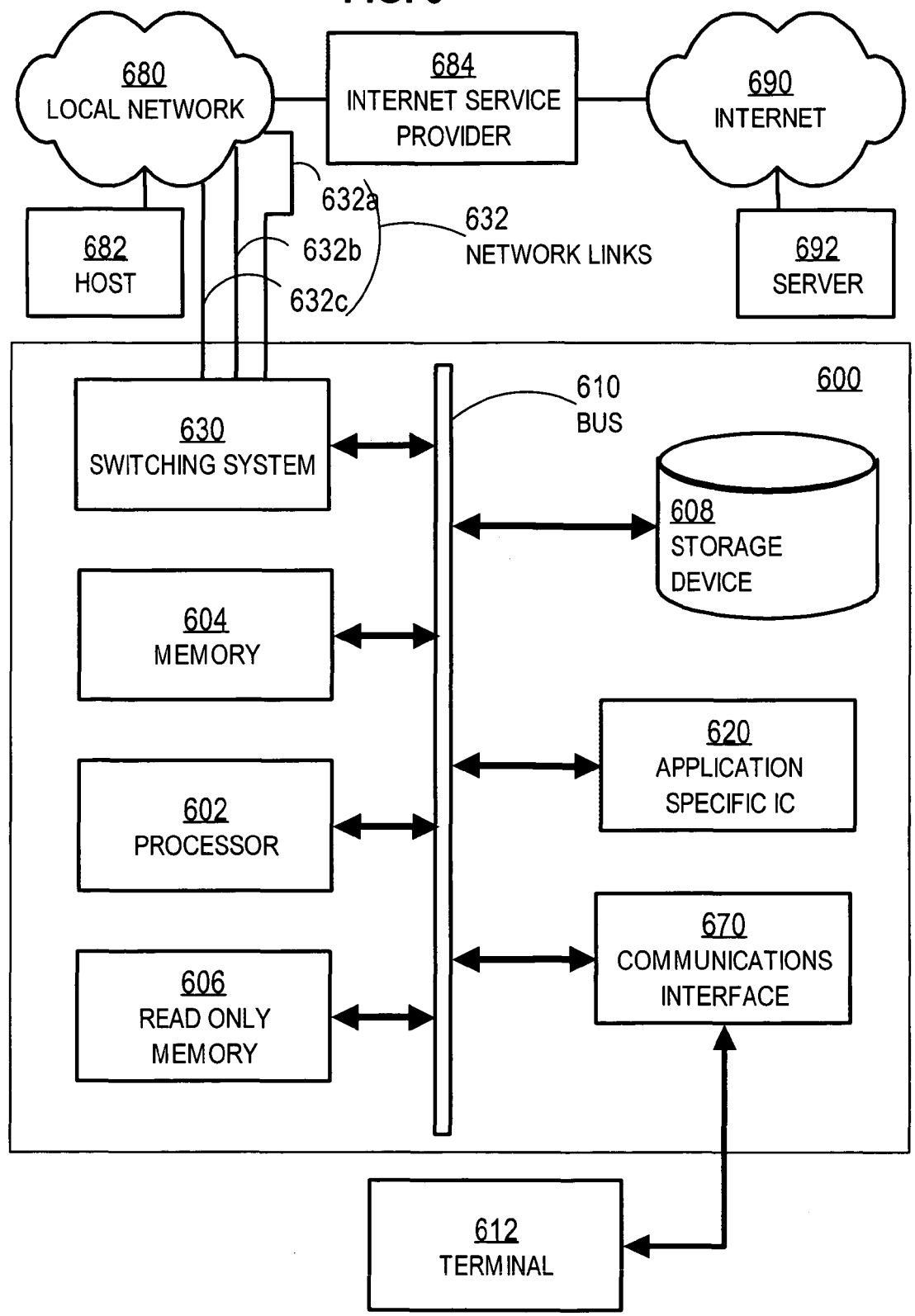
FIG. 6 is a block diagram that illustrates a computer system configured as a router upon which an embodiment of the invention may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method to separately account for multiple transactions during a communication session between a client device and a server device, the method comprising:
receiving at a service gateway node a plurality of Internet protocol (IP) packets associated with first and second transactions for the communication session between the client device and the server device, wherein the packets include payload data and wherein the communication session is initiated at the client device using a communications application provided to a subscriber for installation on the client device;
creating at the service gateway node a transaction table, the transaction table including a first transaction record comprising first and second sequence ranges associated with the first transaction and a second transaction record comprising first and second sequence ranges associated with the second sequence range, wherein each of the first sequence ranges corresponds to a client-to-server packet transmission direction and each of the second sequence ranges corresponds to a server-to-client packet transmission direction;
for an IP packet:
determining at the service gateway node a packet transmission direction of the packet and a packet sequence number in a header of the IP packet;
parsing at the service gateway node the payload data to determine a boundary between a first transaction and a second transaction for the communication session; and
assigning each one of a plurality of bytes associated with the IP packet to one of the first transaction and the second transaction based on the packet transmission direction, the packet sequence number and the boundary;
updating a first byte count included in the first transaction record to indicate a number of bytes assigned to the first transaction during the communication session;
updating a second byte count included in the second transaction record to indicate a number of bytes assigned to the second transaction during the communication session;
determining first accounting data for the first transaction based, at least in part, on the first byte count and first correlation data for the first transaction, wherein the first correlation data includes at least one of a URL of a resource delivered in connection with the first transaction, a content provider of the resource, a billing rate for the resource, information identifying a subscriber associated with the client device, and user profile information associated with the subscriber;
forming a billing record based on the first accounting data for the first transaction; and
communicating the billing record to a billing server, wherein the billing server charges at least one of a party that requested the first transaction and a party that responded to the first transaction an amount indicated in the billing record based on completion of the first transaction.

2. The method of claim 1, wherein the parsing includes parsing the payload data based, at least in part, on a Carriage Return and Line Feed (CRLF) pattern to determine the boundary data.

3. The method of claim 1, further comprising:
determining second accounting data for the second transaction based, at least in part, on the second byte count and second correlation data for the second transaction, wherein the second correlation data includes at least one of a URL of a resource delivered in connection with the second transaction, a content provider of the resource delivered in connection with the second transaction, a billing rate for the resource delivered in connection with the second transaction, an identity of the subscriber associated with the client device, and user profile information associated with the subscriber;
forming a billing record based on the second accounting data for the second transaction; and
communicating the billing record to a billing server, wherein the billing server charges at least one of a party that requested the second transaction and a party that responded to the second transaction an amount indicated in the billing record based on completion of the second transaction.

4. The method of claim 1, further comprising:
maintaining one or more associations between the first and second transactions and byte counts for a time interval sufficient to allow retransmissions to be counted against at least one of the first and second transactions.

5. The method of claim 1, further comprising identifying a transaction with a sequence number range that encompasses the sequence number and assigning the bytes to the transaction.

6. The method of claim 1, further comprising determining whether the IP packet is in a client-to-server direction or a server-to-client direction, and updating a start sequence number and an end sequence number for the client-to-server direction or the server-to-client direction based on the sequence number and boundary.

7. The method of claim 1, further comprising:
determining a first per-byte charge associated with the first transaction; and
determining the first accounting data based, at least in part, on multiplying the first byte count by the first per-byte charge.

8. The method of claim 1, wherein at least one of the first and second transactions is associated with a first content resource related to a first content provider that charges a first billing rate associated with a first byte count, and wherein at least one of the first and second transactions is associated with a second content source related to a second content provider that charges a second billing rate associated with a second byte count.

9. A non-transitory media comprising logic that includes code for execution and when executed by a processor operable to perform operations comprising:
receiving at a service gateway node a plurality of Internet protocol (IP) packets associated with first and second transactions for the communication session between the client device and the server device, wherein the packets include payload data and wherein the communication session is initiated at the client device using a communications application provided to a subscriber for installation on the client device;
creating at the service gateway node a transaction table, the transaction table including a first transaction record comprising first and second sequence ranges associated with the first transaction and a second transaction record comprising first and second sequence ranges associated with the second sequence range, wherein each of the first sequence ranges corresponds to a client-to-server packet transmission direction and each of the second sequence ranges corresponds to a server-to-client packet transmission direction;
for an IP packet:
determining at the service gateway node a packet transmission direction of the packet and a packet sequence number in a header of the IP packet;
parsing at the service gateway node the payload data to determine a boundary between a first transaction and a second transaction for the communication session; and
assigning each one of a plurality of bytes associated with the IP packet to one of the first transaction and the second transaction based on the packet transmission direction, the packet sequence number and the boundary;
updating a first byte count included in the first transaction record to indicate a number of bytes assigned to the first transaction during the communication session;
updating a second byte count included in the second transaction record to indicate a number of bytes assigned to the second transaction during the communication session;
determining first accounting data for the first transaction based, at least in part, on the first byte count and first correlation data for the first transaction, wherein the first correlation data includes at least one of a URL of a resource delivered in connection with the first transaction, a content provider of the resource, a billing rate for the resource, information identifying a subscriber associated with the client, and user profile information associated with the subscriber;
forming a billing record based on the first accounting data for the first transaction; and
communicating the billing record to a billing server, wherein the billing server charges at least one of a party that requested the first transaction and a party that responded to the first transaction an amount indicated in the billing record based on completion of the first transaction.

10. The media of claim 9, wherein the parsing includes parsing the payload data based, at least in part, on a Carriage Return and Line Feed (CRLF) pattern to determine boundary data.

11. The media of claim 9, the operations further comprising further comprising:
determining second accounting data for the second transaction based, at least in part, on the second byte count and second correlation data for the second transaction, wherein the second correlation data includes at least one of a URL of a resource delivered in connection with the second transaction, a content provider of the resource delivered in connection with the second transaction, a billing rate for the resource delivered in connection with the second transaction, an identity of the subscriber associated with the client device, and user profile information associated with the subscriber;
forming a billing record based on the second accounting data for the second transaction; and
communicating the billing record to a billing server, wherein the billing server charges at least one of a party that requested the second transaction and a party that responded to the second transaction an amount indicated in the billing record based on completion of the second transaction.

12. The media of claim 9, the operations further comprising:
maintaining one or more associations between the first and second transactions and byte counts for a time interval sufficient to allow retransmissions to be counted against at least one of the first and second transactions.

13. The media of claim 9, the operations further comprising identifying a transaction with a sequence number range that encompasses the sequence number and assigning the bytes to the transaction.

14. The media of claim 9, further comprising determining whether the IP packet is in a client-to-server direction or a server-to-client direction, and updating a start sequence number and an end sequence number for the client-to-server direction or the server-to-client direction based on the sequence number and boundary.

15. An apparatus for separately accounting for multiple transactions during a communication session between a client device and a server device over a network using Transmission Control Protocol, the apparatus comprising:
a processor; and
a memory coupled to the processor, wherein the processor and the memory cooperate such that the apparatus is configured for:
receiving at a service gateway node a plurality of Internet protocol (IP) packets associated with first and second transactions for the communication session between the client device and the server device, wherein the packets include payload data and wherein the communication session is initiated at the client using a communications application provided to a subscriber for installation on the client device;
creating at the service gateway node a transaction table, the transaction table including a first transaction record comprising first and second sequence ranges associated with the first transaction and a second transaction record comprising first and second sequence ranges associated with the second sequence range, wherein each of the first sequence ranges corresponds to a client-to-server packet transmission direction and each of the second sequence ranges corresponds to a server-to-client packet transmission direction;
for an IP packet:
determining at the service gateway node a packet transmission direction of the packet and a packet sequence number in a header of the IP packet;
parsing at the service gateway node the payload data to determine a boundary between a first transaction and a second transaction for the communication session; and
assigning each one of a plurality of bytes associated with the IP packet to one of the first transaction and the second transaction based on the packet transmission direction, the packet sequence number and the boundary;
updating a first byte count included in the first transaction record to indicate a number of bytes assigned to the first transaction during the communication session;
updating a second byte count included in the second transaction record to indicate a number of bytes assigned to the second transaction during the communication session;
determining first accounting data for the first transaction based, at least in part, on the first byte count and first correlation data for the first transaction, wherein the first correlation data includes at least one of a URL of a resource delivered in connection with the first transaction, a content provider of the resource, a billing rate for the resource, information identifying a subscriber associated with the client, and user profile information associated with the subscriber;
forming a billing record based on the first accounting data for the first transaction; and
communicating the billing record to a billing server, wherein the billing server charges at least one of a party that requested the first transaction and a party that responded to the first transaction an amount indicated in the billing record based on completion of the first transaction.

* * * * *